3,517,009
4-HYDROXY(LOWER)ALKYLAMINO-N,2-DISUB-
STITUTED-5-PYRIMIDINECARBOXAMIDES
Dong H. Kim, Wayne, and Arthur A. Santilli, Havertown,
Pa., assignors to American Home Products Corporation, New York, N.Y., a corporation of Delaware
No Drawing. Filed Apr. 5, 1968, Ser. No. 719,240
Int. Cl. C07d 51/42
U.S. Cl. 260—256.4      10 Claims

ABSTRACT OF THE DISCLOSURE

This invention is concerned with 4-hydroxy(lower)alkylamino-N,2-disubstituted - 5-pyrimidinecarboxamides which are pharmacologically active as central nervous system depressants.

The present invention relates to new and novel pyrimidinecarboxamides. In particular, it is concerned with 4-hydroxy(lower)alkylamino-N,2 - disubstituted-5-pyrimidinecarboxamides which have demonstrated activity as central nervous system depressants in standard and accepted pharmacological procedures.

The new and novel compounds within the scope of the present invention are represented by the following structural formula:

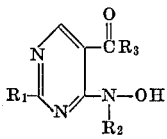

wherein $R_1$ is selected from the group consisting of lower alkyl, phenyl, halophenyl, lower alkylphenyl and lower alkoxyphenyl; $R_2$ is lower alkyl and $R_3$ is selected from the group consisting of lower alkoxy(lower)alkylamino, phen(lower)alkylamino, halophen(lower)alkylamino, pyrrolidinyl(lower)alkylamino, di(lower)alkylamino(lower)alkylamino, lower alkylpiperazinyl, piperidino(lower)alkylamino and pyridyl(lower)alkylamino. As employed herein the terms "lower alkyl," "lower alkoxy" and the like are meant to include both branched and straight chain moieties having from one to about eight carbon atoms. Typical examples thereof are: 4-hydroxymethylamino-N-(2 - dimethylaminoethyl)-2 - phenyl - 5 pyrimidinecarboxamide; 4 - hydroxymethylamino-N-(2-methoxyethyl)-2-phenyl - 5 - pyrimidinecarboxamide; 4-hydroxymethylamino-2-phenylpyrimidin - 5 - yl-4-methylpiperazin-1-yl ketone; 4-hydroxymethylamino-2-phenyl-N-(3-pyridylmethyl)-5 - pyrimidinecarboxamide; 2-(m-chlorophenyl)-4-hydroxymethylamino - N - (2-methoxyethyl)-5-pyrimidine carboxyamide; 2-(p-bromophenyl)-N-(3 - diethylaminopropyl) - 4 - ethylhydroxyamino-5-pyrimidinecarboxamide; 4 - ethylhydroxyamino - N-(4-methoxybutyl) - 2 - (p-methoxyphenyl)-5-pyrimidinecarboxamide; and N-benzyl-4 - hydroxymethylamino-2-phenyl-5-pyrimidinecarboxamide.

The new and novel compounds of the present invention are prepared by the process which is hereinafter schematically depicted:

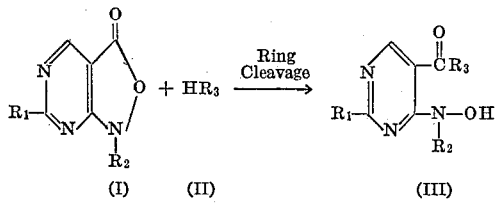

wherein $R_1$, $R_2$ and $R_3$ are defined as above. The ring cleavage reaction is effected by contacting an appropriate 1-alkyl-6 - substituted isoxazolo[3,4-d]pyrimidin-3(1H)-one (I) with an appropriate amine (II) at about reflux temperatures for a period of about one to about four hours. When the ring cleavage is complete, the resulting 4-hydroxy(lower)alkylamino-N,2-disubstituted-5-pyrimidinecarboxamide (III) is separated by standard recovery procedures e.g. the excess amine is removed under reduced pressure and the residue recrystallized from a suitable solvent, such as, an alkanol, an alkanol-liquid alkane mixture and a water-dimethylformamide mixture.

It should be noted that the above-described process may be conducted without a solvent when the amine (II) reactant is a liquid. Alternatively, when the amine (II) is a solid the reaction is conducted in a reaction-inert organic solvent which will readily suggest themselves to one skilled in the art of chemistry e.g. dimethylformamide, dimethylacetamide and ethyleneglycol dimethylether. In this regard, any organic solvent which will dissolve the reactants and not interfere with their interaction may be employed. The 1-alkyl-6-substituted isoxazolo[3,4-d]pyrimidin-3(1H)-ones (I) which are employed as starting materials in the above process are prepared and described in copending U.S. patent application, Ser. No. 719,239, entitled "1-Alkyl-6-Substituted Isoxazolo[3,4-d]Pyrimidin-3(1H)-Ones" by Dong H. Kim and Arthur A. Santilli, filed in the United States Patent Office on the same day as the subject application. The amines (II) which are also employed as starting materials in this process are commercially available or are easily prepared by well known chemical procedures.

The new and novel 4-hydroxy(lower)alkylamino-N-2-disubstituted-5-pyrimidinecarboxamides of the present invention possess valuable pharmacological activity. In particular, these compounds in standard laboratory tests exhibit central nervous system activity and are useful as depressant agents to produce a calming effect.

In the pharmacological evaluation of the central nervous system depressant compounds of this invention the in vivo effects of the compounds of this invention were tested by the procedure described by Turner, in Screening Methods in Pharmacology, Academic Press, New York, p. 80 (1965) in the section entitled, "A Test for Central Depressants."

When the 4-hydroxy(lower)alkylamino-N,2-disubstituted-5-pyrimidinecarboxamides (III) of the present invention are administered orally to mice as a one percent suspension emulsified with polyethylene oxide sorbitan monooleate, they induce a decreased motor activity and decreased respiration at a dosage range from 127 mg./kilo to 400 mg./kilo. There were no deaths in the test animals at the highest oral dose used, 400 mg./kg.

When the compounds of this invention are employed as central nervous system depressants in warm-blooded animals e.g. mice, rats, rabbits, guinea pigs, cats, dogs, monkeys and the like, they may be administered alone or in combination with pharmacologically acceptable carriers, the proportion of which is determined by the solubility and chemical nature of the compound, chosen route of administration and standard biological practice. For example, they may be administered orally as solids containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present pharmacologically active

3 agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of 3.0 g. of 1-methyl-6-phenylisoxazolo-[3,4-d]primidin-3(1H)-one and 30 ml. of N,N-dimethylethylenediamine is refluxed for one hour. The excess amine is removed under reduced pressure to give a yellow solid which is recrystallized from ethylacetate to yield 2.8 g. of 4-hydroxymethylamino - N - (2-dimethylaminoethyl)-2-phenyl-5-pyrimidinecarboxamide, M.P. 155–157° C.

Analysis.—Calc'd for $C_{16}H_{21}N_5O_2$ (percent): C, 60.93; H, 6.71; N, 22.21. Found (percent): C, 61.04; H, 6.44; N, 22.07.

In a similar manner, the following compounds are prepared:

N-(4-diethylaminobutyl) - 4 - ethylhydroxyamino - 2-phenyl-5-pyrimidinecarboxamide from 1-ethyl-6-phenyl isoxazolo[3,4-d]pyrimidin-3(1H)-one and diethylaminobutylamine.

4-hydroxypropylamino - N - (3-dimethylaminopropyl)-2-phenyl-5-pyrimidinecarboxamide from 6-phenyl-1-propylisoxazole[3,4-d]pyrimidin-3(1H)-one and dimethylaminopropylamine.

EXAMPLE II 4-hydroxymethylamino - N - (2-methoxyethyl)-2-phenyl-5-pyrimidinecarboxamide is prepared as in Example 1 from 1-methyl - 6 - phenylisoxazolo[3,4-d]pyrimidin-3-(1H)-one and 2-methoxyethylamine. An analytical sample (M.P. 147.5–149° C.) is obtained by recrystallization from ethanol and heptane.

Analysis.—Calc'd for $C_{15}H_{18}N_4O_3$ (percent): C, 59.59; H, 6.00; N, 18.53. Found (percent): C, 59.49; H, 5.85; N, 18.58.

Similarly, 2-(m-chlorophenyl) - 4 - hydroxymethylamino-N-(2-methoxyethyl)-5-pyrimidinecarboxamide is prepared from 6-(m-chlorophenyl) - 1 - methylisoxazolo-[3,4-d]pyrimidin-3(1H)-one and 2-methoxyethylamine.

EXAMPLE III

A mixture of 2.0 g. of 1-methyl-6-phenylisoxazolo-[3,4-d]pyrimidin-3(1H)-one and 15 ml. of N-methylpiperazine is refluxed for one and a quarter hours. After removing the excess N-methylpiperazine a small amount of heptane is added to the residual semi-solid and scratched. The resulting solid is collected on a filter, and recrystallized from ethanol and heptane to give 1.7 g. of 4-hydroxymethylamino-2-phenylpyrimidin - 5 - yl - 4 - methylpiperazin-1-yl ketone, M.P. 156.5–159° C.

Analysis.—Calc'd for $C_{17}H_{21}N_5O_2$ (percent): C, 62.63; H, 6.47; N, 21.39. Found (percent): C, 62.55; H, 6.49; N, 21.63.

Similarly, the following compounds are prepared:

4-hydroxymethylamino-2-methylpyrimidin-5 - yl - 4 - methylpiperazin-1-yl ketone from 1,6-dimethylisoxazolo [3,4-d]-pyrimidin-3(1H)-one and N-methylpiperazine;

2-ethyl-4-ethylhydroxyamino pyrimidin-5-yl-4 - ethyl-piperazin-1-yl ketone from 1,6-diethylisoxazolo[3,4-d]-pyrimidin-3(1H)-one and N-ethylpiperazine;

4-ethylhydroxyamino-2-isobutylpyrimidin-5-yl-4 - butyl-piperazin-1-yl ketone from 6-isobutylisoxazolo[3,4 - d]-pyrimidin-3(1H)-one and N-butylpiperazine.

4

EXAMPLE IV

A mixture of 1.85 g. of 1-methyl-6-phenylisoxazolo-[3,4-d]pyrimidin-3(1H)-one and 15 ml. of 3 - aminomethylpyridine is refluxed for one and a quarter hours. Chilling of the reaction mixture causes separation of a small amount of product. A major portion of the product is obtained by pouring the filtrate into about 200 ml. of cold water and scratching the separated oil. The combined product is recrystallized from 95% ethanol, to give 1.3 g. of 4-hydroxymethylamino-2-phenyl-N-(3-pyridylmethyl)-5-pyrimidinecarboxamide, M.P. 173–175° C.

Analysis.—Calcd. for $C_{18}H_{17}N_5O_2$ (percent): C, 64.56; H, 5.11; N, 20.89. Found (percent): C, 64.72; H, 4.96; N, 21.08.

Similarly, 4-ethylhydroxyamino-2 - (m-iodophenyl)-N-(3 - pyridylethyl) - 5 - pyrimidinecarboxamide and 2-(p-chlorophenyl)-4-hydroxymethylamino-N - (3 - pyridylpropyl)-5-pyrimidinecarboxamide are synthesized.

EXAMPLE V

A mixture of 6.0 g. of 6-(p-bromophenyl)-1-ethyl-isoxazolo[3,4-d]pyrimidin-3(1H)-one and 60 ml. of 3-diethylaminopropylamine is refluxed for four hours. Thereafter, the excess amine is removed under vacuum and the residue is recrystallized from dimethylformamide to afford 2-(p-bromophenyl)-N-(3-diethylaminopropyl)-4-ethylhydroxyamino-5-pyrimidinecarboxamide.

In a similar manner, 6-(p-fluorophenyl)-1-propyl-isoxazolo[3,4-d]pyrimidin-3(1H)-one is reacted with dimethylaminopropylamine to produce 2-(p-fluorophenyl)-4-hydroxypropylamino-N-(3 - dimethylaminopropyl) - 5-pyrimidinecarboxamide.

EXAMPLE VI

Repeating the procedure of Examples I–V to react a 1-alkyl-6-substituted isoxazolo[3,4-d]pyrimidin - 3(1H)-one with an appropriate amine the following compounds are prepared:

4-hydroxymethylamino-N-(2-dipropylaminoethyl)-2-(p-tolyl)-5-pyrimidinecarboxamide;

N-(3-ethoxypropyl)-4-hydroxymethylamino-2-(p-isopropylphenyl)-5-pyrimidinecarboxamide;

4-ethylhydroxyamino-N-(4-methoxybutyl)-2-(p-methoxyphenyl)-5-pyrimidinecarboxamide;

2-(m-ethylphenyl)-4-hydroxymethylamino-N-piperidinoethyl-5-pyrimidinecarboxamide;

2-(p-butylphenyl)-4-hydroxymethylamino-N-(2-piperidinoethyl)-5-pyrimidinecarboxamide;

2-(o-ethoxyphenyl)-4-ethylhydroxyamino-N-(4-piperidinobutyl)-5-pyrimidinecarboxamide;

N-benzyl-4-hydroxymethylamino-2-phenyl-5-pyrimidinecarboxamide;

N-(p-chlorobenzyl)-2-(p-chlorophenyl)-4-hydroxymethylamino-5-pyrimidinecarboxamide;

N-(p-bromophenethyl)-4-hydroxypentylamino-2-phenyl-5-pyrimidinecarboxamide;

N-(p-fluorobenzyl)-4-hydroxymethylamino-2-propyl-5-pyrimidinecarboxamide;

4-hydroxymethylamino-2-methyl-N-(4-phenbutyl)-5-pyrimidinecarboxamide;

4-ethylhydroxyamino-2-phenyl-N-[3-(1-pyrrolidinyl)-propyl]-5-pyrimidinecarboxamide; and 4-hydroxymethylamino-2-methyl-N-[2-(1-pyrrolidinyl)-ethyl]-5-pyrimidinecarboxamide.

What is claimed is:

1. A compound selected from the group having the formula:

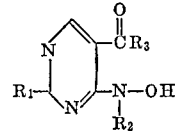

wherein $R_1$ is selected from the group consisting of lower alkyl, phenyl, halophenyl, lower alkylphenyl and lower alkoxyphenyl; $R_2$ is lower alkyl and $R_3$ is selected from the group consisting of lower alkoxy(lower)alkylamino, phen(lower)alkylamino, halophen(lower)alkylamino, pyrrolidinyl(lower)alkylamino, di(lower)alkylamino (lower)alkylamino, lower alkylpiperazinyl, piperidino (lower)alkylamino and pyridyl(lower)alkylamino.

2. A compound as described in claim 1 which is: 4-hydroxymethylamino-N-(2-dimethylaminoethyl) - 2-phenyl-5-pyrimidinecarboxamide.

3. A compound as described in claim 1 which is: 4-hydroxymethylamino - N - (2 - methoxyethyl)-2-phenyl - 5-pyrimidinecarboxamide.

4. A compound as described in claim 1 which is: 4-hydroxymethylamino - 2 - phenylpyrimidin - 5 - yl-4-methylpiperazin-1-yl ketone.

5. A compound as described in claim 1 which is: 4-hydroxymethylamino - 2 - phenyl-N-(3-pyridylmethyl) - 5-pyrimidinecarboxamide.

6. A compound as described in claim 1 which is: 2-(m-chlorophenyl) - 4 - hydroxymethylamino - N - (2 - methoxyethyl)-5-pyrimidinecarboxamide.

7. A compound as described in claim 1 which is: 2-(p-bromophenyl) - N - (3 - diethylaminopropyl)-4-ethylhydroxyamino-5-pyrimidinecarboxamide.

8. A compound as described in claim 1 which is: 4-ethylhydroxyamino - N - (4 - methoxybutyl)-2-(p-methoxyphenyl)-5-pyrimidinecarboxamide.

9. A compound as described in claim 1 which is: N-benzyl - 4 -hydroxymethylamino - 2 - phenyl - 5 - pyrimidinecarboxamide.

10. A compound as described in claim 1 which is: N-(p - chlorobenzyl)-2-(p-chlorophenyl) - 4-hydroxymethylamino-5-pyrimidinecarboxamide.

References Cited

UNITED STATES PATENTS 3,022,306   2/1962   Strube _____ 260—256.4

ALEX MAZEL, Primary Examiner

R. J. GALLAGHER, Assistant Examiner

U.S. Cl. X.R.

424—251